United States Patent
Hu et al.

(10) Patent No.: US 10,084,549 B2
(45) Date of Patent: Sep. 25, 2018

(54) SINGLE PHOTONS COMMUNICATION METHOD AND SYSTEM

(71) Applicant: Shanxi University, Taiyuan, Shanxi province (CN)

(72) Inventors: Jianyong Hu, Taiyuan (CN); Jie Ma, Taiyuan (CN); Linjie Zhang, Taiyuan (CN); Liantuan Xiao, Taiyuan (CN); Suotang Jia, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 15/385,452

(22) Filed: Dec. 20, 2016

(65) Prior Publication Data
US 2017/0331560 A1    Nov. 16, 2017

(30) Foreign Application Priority Data
May 12, 2016 (CN) .......................... 2016 1 0315838

(51) Int. Cl.
*H04B 10/70* (2013.01)
*H04B 10/532* (2013.01)
(Continued)

(52) U.S. Cl.
CPC ......... *H04B 10/70* (2013.01); *H04B 10/5161* (2013.01); *H04B 10/532* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2004/0110206 A1* | 6/2004 | Wong | G01N 21/6408 435/6.14 |
| 2014/0153926 A1* | 6/2014 | Mower | H04B 10/70 398/101 |

(Continued)

FOREIGN PATENT DOCUMENTS

| | | |
|---|---|---|
| CN | 1813429 A | 8/2006 |
| CN | 103812809 A | 5/2014 |

(Continued)

OTHER PUBLICATIONS

Jian-Yong Hu , Experimental quantum secure direct communication with single photons,Light: Science & Applications (2016) 5, e16144; doi:10.1038/lsa.2016.144; published online Sep. 9, 2016, pp. 1-5.*
(Continued)

*Primary Examiner* — David Payne
*Assistant Examiner* — Omar S Ismail
(74) *Attorney, Agent, or Firm* — JCIPRNET

(57) ABSTRACT

A single photons communication method and system is provided. In an example, an information loading module in a transmitting terminal of the single photons communication system may code to-be-sent target information as a corresponding target modulation frequency according to a pre-saved relationship between information and modulation frequency, and perform frequency modulation on a quantum state of communication light generated by a light source by using the target modulation frequency so that the transmitting terminal may send out modulated target communication light. After receiving the target communication light, an information decoding module in a receiving terminal of the single photons communication system may decode the target modulation frequency from a sequence of receiving photons of the target communication light through Fourier transform or other ways, and obtain target information corresponding (Continued)

to the target modulation frequency according to the relationship between information and modulation frequency.

11 Claims, 10 Drawing Sheets

(51) Int. Cl.
*H04B 10/516* (2013.01)
*H04B 10/556* (2013.01)
*H04L 9/08* (2006.01)

(52) U.S. Cl.
CPC ..... *H04B 10/5561* (2013.01); *H04B 10/5563* (2013.01); *H04L 9/0852* (2013.01)

(56) References Cited

U.S. PATENT DOCUMENTS

| | | | |
|---|---|---|---|
| 2014/0205301 A1* | 7/2014 | Frohlich | H04B 10/70 398/152 |
| 2015/0236791 A1 | 8/2015 | Nordholt et al. | |
| 2016/0234018 A1* | 8/2016 | Frohlich | H04B 10/70 |
| 2016/0359624 A1* | 12/2016 | Kim | H04L 9/0855 |

FOREIGN PATENT DOCUMENTS

| | | |
|---|---|---|
| CN | 104717166 A | 6/2015 |
| WO | 2012044149 A1 | 4/2012 |
| WO | 2013135932 A1 | 9/2013 |

OTHER PUBLICATIONS

Jian-Yong Hu(NPL Doc—Experimental quantum secure direct communication with single photons: https://arxiv.org/abs/1503.00451, published online May 5, 2015—pp. 1-21).*

Jian-Yong Hu et al: "Experimental quantum secure direct communication with single photons", Light: Science & Applications, vol. 5, No. 9, Sep. 9, 2016 (Sep. 9, 2016), p. e16144, XP055384896.

European Patent Office: European Search Report mailed in corresponding European Patent Application No. 16202586.0 dated Jul. 6, 2017 (11 pages).

Yan Liu; Single-photon modulation spectrum; Chinese. Physics. B; Jan. 31, 2014; pp. 010101-1 to 010101-5; vol. 23, No. 1 (2014).

State Intellectual Property Office of the People's Republic of China, Office Action and Search Report Issued in Application No. 201610315838.9, dated Nov. 27, 2017, 6 pages.

* cited by examiner

SINGLE PHOTONS COMMUNICATION METHOD AND SYSTEM

RELATED APPLICATION

This application claims priority to Chinese Patent Application No. 201610315838.9, entitled "SINGLE PHOTONS COMMUNICATION METHOD AND SYSTEM" filed on May 12, 2016, which is incorporated herein by reference in its entirety.

TECHNICAL FIELD

The present disclosure relates to a communication method and system, and more particularly, to a single photons communication method and system.

BACKGROUND

At present, in quantum communication or some extreme cases, a receiver of a communication system may only receive communication light at the single-photon level. The extreme communication may be, for example, ultra-distance interstellar communication, satellite-ground communication in adverse weather conditions and underwater communication highly sensitive to loss and noise, etc. In the prior art, information may be encoded on the intensity of communication light, and when received communication light is at the single-photon level, information decoding may be performed by extending the integration time of photon counting.

However, in the prior art, a signal-to-noise ratio of photon counting may be very low due to shot noise at the single-photon level within short integration time. Therefore, to meet requirements of signal-to-noise for photon counting at a receiving terminal, it is necessary to maintain a long integration time. Therefore, in existing communication technologies, the channel capacity may be extremely low when a receiver of a communication system may only receive communication light at the single-photon level due to the long integration time.

SUMMARY

Examples of the present disclosure provide a single photons communication method and system, which are used to solve a problem in existing communication technologies that a channel capacity may be extremely low when a receiver of a communication system may only receive communication light at the single-photon level.

According to a first aspect of the present disclosure, a single photons communication method is provided, comprising:

saving, by an information loading device in a transmitting terminal of an optical communication system, a relationship between information and modulation frequency;

receiving, by the information loading device, to-be-sent target information;

coding, by the information loading device, the to-be-sent target information as a target modulation frequency according to the relationship between information and modulation frequency; and modulating, by the information loading device, a quantum state of communication light generated by a light source according to the target modulation frequency so that the transmitting terminal sends out target communication light modulated according to the target modulation frequency.

According to a second aspect of the present disclosure, a single photons communication method is provided, comprising:

saving, by an information decoding device in a receiving terminal of an optical communication system, a relationship between information and modulation frequency;

receiving, by the information decoding device in the receiving terminal, target communication light;

recording, by the information decoding device, a time sequence of receiving photons of the target communication light according to a quantum state of the target communication light;

decoding, by the information decoding device, a target modulation frequency according to which the quantum state of the target communication light is modulated, through a Fourier transform from the time sequence of receiving photons; and obtaining, by the information decoding device, target information corresponding to the target modulation frequency according to the relationship between information and modulation frequency.

According to a third aspect of the present disclosure, a single photons communication system is provided, including:

a transmitting terminal, comprising:
  a light source, configured to generate communication light; and
  an information loading device, configured to receive to-be-sent target information, code the to-be-sent target information as a target modulation frequency according to a relationship between information and modulation frequency, and perform frequency modulation on a quantum state of the communication light according to the target modulation frequency so that the transmitting terminal sends out target communication light modulated according to the target modulation frequency;

a receiving terminal, comprising:
  a single-photon detector, configured to detect the target communication light and send out a pulse sequence of receiving photons of the target communication light according to the quantum state of the target communication light; and
  a decoding device, configured to decode, through a Fourier transform from the time sequence of receiving photons, the target modulation frequency according to which frequency modulation is performed on the quantum state of the target communication light, and obtain target information corresponding to the target modulation frequency according to the relationship between information and modulation frequency.

As can be seen from the above technical solution, the present disclosure proposes a single photons communication method and system. According to the method, a single-photon detector is introduced and information may be coded by using a multi-channel frequency coding scheme. An emission probability or a quantum state of the communication light may be modulated at a transmitting terminal according to a modulation frequency to implement loading of information. And extraction of the information may be implemented by performing a spectral analysis on a single photons pulse sequence measured by the single-photon detector. By using the multi-channel frequency coding scheme, the channel capacity could be improved significantly at the single-photon level.

DETAILED DESCRIPTION

In the following examples, the present disclosure may focus on coding by way of multi-channel frequency coding at the single-photon level. The optical communication has been widely-used with intense laser. There are various analog and digital modulation used in optical communication. The typical digital modulation may include pulse-code modulation, pulse-position modulation, frequency-shift keying subcarrier modulation, and so on. The typical analog modulation include baseband modulation, optic frequency modulation, subcarrier modulation (frequency modulation and amplitude modulation), and so on. Besides, an analog message can be coded for digital transmission. However, when the communication between two nodes is too long to use the normal optical transceiver, an optic amplifier need to be used, which is impossible for some extreme cases. And the background noise would direct lead to the errors of digital modulation, and distortion of analog signal. Besides, the bandwidth of a subcarrier frequency modulation is limited by sampling theorem, which will greatly limit its channel capacity.

Compared with the existing communication technology, a multi-channel frequency coding scheme being applied on the optical communication at the single-photon level may bring beneficial effects as follows. First, the multi-channel frequency coding scheme may decode information by recovering a spectrum of single-photon sequence, endure a higher light intensity loss and provide a farther communication distance. Secondly, the photons are randomly detected by the single-photon detector, according to the non-uniform sampling theory, it can break through the limitation of sampling theorem and operate in a wide frequency bandwidth. Additionally, the random noise act as white noise in frequency domain, which make it has slightly influence on the information decoding.

In the following examples of the present disclosure, frequency modulation may be performed on the quantum state (polarization or phase) of a light source, at the single-photon level, a single-photon detector may be used to receive photons and record a time sequence of receiving the photons, an original modulation frequency may be recovered through a Fourier transform, and finally information decoding may be performed through the recovered original modulation frequency. Note that the quantum state mentioned in the examples of the present disclosure may include emission probability, polarization state and phase of photons.

Figure 1:
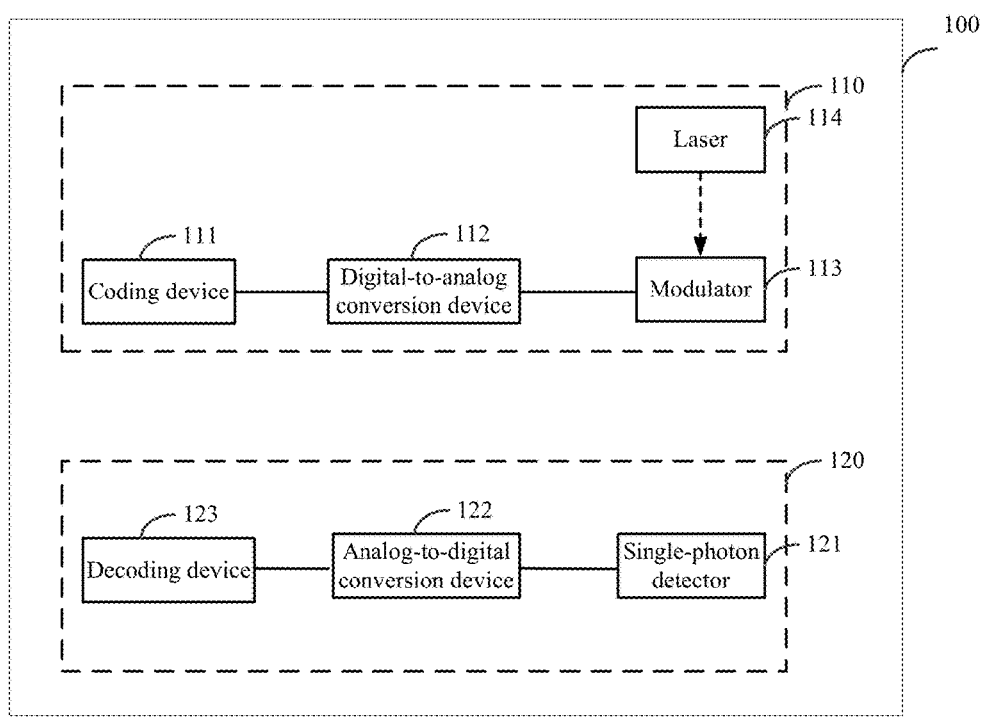
FIG. 1 is a schematic architecture diagram of a single photons communication system according to one example of the present disclosure.

FIG. 1 is a schematic architecture diagram of a single photons communication system according to one example of the present disclosure.

As shown in FIG. 1, the solid and dashed lines denote the electrocircuit and the light route respectively. The communication system 100 may take laser as communication light, and may include a transmitting terminal 110 and a receiving terminal 120. The transmitting terminal 110 comprises a coding device 111, a digital-to-analog conversion device 112, a modulator 113 and a laser 114. The receiving terminal 120 comprises a single-photon detector 121, an analog-to-digital conversion device 122 and a decoding device 123. In interstellar communication, loss of data may be higher on a channel between the transmitting terminal 110 and the receiving terminal 120 due to a longer communication distance.

At the transmitting terminal 110, the coding device may transform the information to a digital signal. Then, the digital-to-analog conversion device 112 may convert the digital signal into an analog signal, according to the corresponding relationship between information and modulation frequency, and may send the analog signal to the modulator 113. The modulator 113 may perform frequency modulation on laser generated by the laser 114 according to a frequency of the analog signal. The modulated laser may be sent out from the transmitting terminal 110, specifically the modulator 113. Through transmission via long-distance interstellar space, light intensity of the laser may drop to a single-photon level, and the laser may arrive at the single-photon detector 121 of the receiving terminal 120 and be received.

The single-photon detector 121 may send a TTL pulse sequence signal to the analog-to-digital conversion device 122 according to a photon sequence being detected. The analog-to-digital conversion device 122 may convert the pulse sequence into a discernible digital signal and send the digital signal to the decoding device 123. The decoding device 123 may perform frequency decoding on the digital signal to obtain information sent by the transmitting terminal 110.

A theoretical model for frequency coding which is used by the coding device 111 may be described as below. Photon counting of a coherent light source at the single-photon level follows the Poisson distribution, namely, the probability of a photon appearing on any location of a time axis may be equal. Therefore, one coherent light source at the single-photon level could be viewed as a completely random time-domain waveform, whose spectrum appears to be a white noise distribution. Thus, if frequency modulation is performed on the quantum state of a light source, characteristic spectrum lines corresponding to the modulation frequency may be generated on the spectrum of the quantum state on a basis of the white noise. The modulation frequency may be determined by measuring locations of the characteristic spectrum lines. In this way, information to be transmitted may be loaded into a modulation frequency of a modulated signal to be coded at the transmitting terminal, the modulation frequency may be obtained by performing Fourier transform, and the information may be obtained by decoding according to the modulation frequency. Thus, the whole transmission process of information may be completed.

For example, an emission probability of a single-photon may be periodically modulated by an intensity modulator, information of the modulation signal may be carried by a sequence of photons, and the corresponding spectrum may be not the white noise distribution any more, instead the corresponding characteristic spectrum lines may appear on the locations corresponding to the modulation frequency. The photon sequence may be transmitted with channel loss and noise produced due to effect of ambient environment. The channel loss and the noise may occur at random without periodicity. In frequency domain, the channel loss may be reflected in overall decrease of spectral amplitude, including decrease of characteristic spectrum lines and decrease of an amplitude of white noise. The noise may be reflected in an amplitude increase of background white noise on the spectrum. Channel loss and noise may decrease of the signal-to-noise ratio of the characteristic spectrum lines. Since the spectrum characteristic of the photon sequence would not be changed by the loss or error of individual photon, effective transmission of information may be achieved even though in a high-loss and strong-noise channel using the multi-channel frequency coding.

It is to be noted that loading of information not only may be achieved by using the intensity modulator, but also may be achieved by using a polarization rotator or a phase modulator, etc. That means, information not only may be loaded with photon intensity modulation, but also may be loaded with a polarization or phase modulation.

Figure 2:
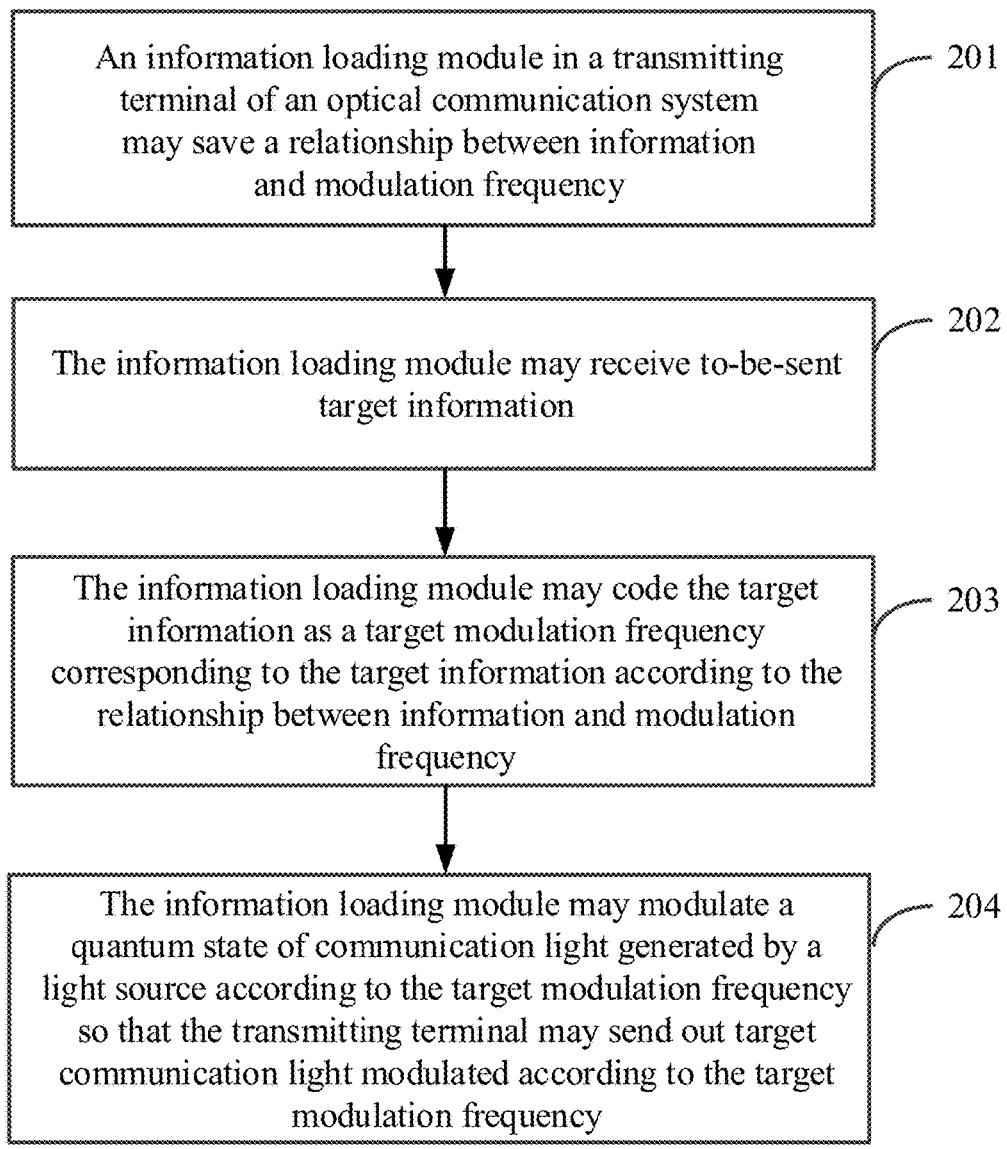
FIG. 2 is a schematic flowchart of a single photons communication method according to one example of the present disclosure.

Referring to FIG. 2, FIG. 2 is a schematic flowchart of a single photons communication method according to one example of the present disclosure. The method may include following blocks.

At block 201, a relationship between information and modulation frequency may be saved by an information loading module in a transmitting terminal of an optical communication system.

In one optional example, the relationship between information and modulation frequency may be established by the following:

A total available modulation bandwidth and a channel spacing of the modulation frequency may be determined according to a channel, a communication system and user demands; the available modulation bandwidth may be divided into a plurality of sub-bands, and the relationship between information and modulation frequency in each of the sub-bands may be respectively determined according to the channel spacing; and at least one sub-band may be allocated to to-be-sent target information.

At this block, to improve the communication efficiency, different sub-band of modulation bandwidth may be allocated for different users or different information types. The relationship between information and modulation frequency within multiple sub-band may be respectively set up. A coding scheme for transmitting an image as shown in Table 1 may be taken as an example.

TABLE 1

| | Red gray scale | | | | | | | | | | |
|---|---|---|---|---|---|---|---|---|---|---|---|
| | R0 | R1 | R2 | R3 | R4 | R5 | R6 | R7 | R8 | R9 | R10 |
| Frequency (kHz) | 75.5 | 74.0 | 72.5 | 71.0 | 69.5 | 68.0 | 66.5 | 65.0 | 63.5 | 62.0 | 60.5 |
| | Green gray scale | | | | | | | | | | |
| | G0 | G1 | G2 | G3 | G4 | G5 | G6 | G7 | G8 | G9 | G10 |
| Frequency (kHz) | 57.5 | 56 | 54.5 | 53 | 51.5 | 50 | 48.5 | 47 | 45.5 | 44 | 42.5 |
| | Blue gray scale | | | | | | | | | | |
| | B0 | B1 | B2 | B3 | B4 | B5 | B6 | B7 | B8 | B9 | B10 |
| Frequency (kHz) | 39.5 | 38 | 36.5 | 35 | 33.5 | 32 | 30.5 | 29 | 27.5 | 26 | 24.5 |

For a color image having an RGB (Red, Green and Blue) format, each pixel point in the image may be described by using three parameters: R, G and B. These three parameters may respectively denote gray values of three primary colors: red, green and blue. According to this principle, a one-to-one correspondence between the gray value of each pixel point and the modulation frequency may be established in Table 1. In Table 1, three groups of gray values (red, green and blue) may respectively correspond to three sub-bands: 60.5~75.5 kHz, 42.5~57.5 kHz and 24.5~39.5 kHz. Gray values may be divided into eleven (0~10) levels, the three groups of gray values (red, green and blue) may correspond to 33 frequency channels in total, and the channel spacing may be 1.5 kHz.

The communication system of the present disclosure may be also used to transmit English texts in addition to images. For example, Table 2A shows a relationship between English letters and the modulation frequency established by User A. Table 2B shows a relationship between English letters and the modulation frequency established by User B.

TABLE 2A

| | Information | | | | | | | | |
|---|---|---|---|---|---|---|---|---|---|
| | A | B | C | D | E | F | G | H | I |
| Frequency (kHz) | 50 | 51.5 | 53 | 54.5 | 56 | 57.5 | 59 | 60.5 | 62 |
| | Information | | | | | | | | |
| | J | K | L | M | N | O | P | Q | R |
| Frequency (kHz) | 63.5 | 65 | 66.5 | 68 | 69.5 | 71 | 72.5 | 74 | 75.5 |

TABLE 2A-continued

| | Information | | | | | | | |
|---|---|---|---|---|---|---|---|---|
| | S | T | U | V | W | X | Y | Z |
| Frequency (kHz) | 77 | 78.5 | 80 | 81.5 | 83 | 84.5 | 86 | 87.5 |

TABLE 2B

| | Information | | | | | | | |
|---|---|---|---|---|---|---|---|---|
| | A | B | C | D | E | F | G | H | I |
| Frequency (kHz) | 150 | 151.5 | 153 | 154.5 | 156 | 157.5 | 159 | 160.5 | 162 |

| | Information | | | | | | | |
|---|---|---|---|---|---|---|---|---|
| | J | K | L | M | N | O | P | Q | R |
| Frequency (kHz) | 163.5 | 165 | 166.5 | 168 | 169.5 | 171 | 172.5 | 174 | 175.5 |

| | Information | | | | | | | |
|---|---|---|---|---|---|---|---|---|
| | S | T | U | V | W | X | Y | Z |
| Frequency (kHz) | 177 | 178.5 | 180 | 181.5 | 183 | 184.5 | 186 | 187.5 |

In Table 2A, the sub-band corresponding to the English alphabet may be from 50 kHz to 87.5 kHz, and the channel spacing may be 1.5 kHz. In Table 2B, the sub-band corresponding to the English alphabet may be from 150 kHz to 187.5 kHz, and the channel spacing may be 1.5 kHz.

At block 202, to-be-sent target information may be received by an information loading module.

At block 203, an information loading module may transform the target information to modulation frequency according to the relationship between information and modulation frequency.

At block 204, quantum state of communication light generated by a light source may be modulated by an information loading module according to the target modulation frequency so that the transmitting terminal may send out modulated target communication light.

In one optional example, the light source of the target communication light may include any one of the following light sources: a laser source (including intense laser and strong attenuated laser); or a single-photon source.

In another optional example, modulating the quantum state of the communication light may include any one of following manners: modulating the emission probability of the communication light; modulating the photon polarization state of the communication light; and modulating the phase of the communication light.

The theoretical model of the single photons communication method in the above examples may be described in detail hereinafter.

First of all, it is to be noted that the channel in the examples of the present disclosure may be characterized by large loss and high noise. Due to channel loss, an intensity of light received by the receiving terminal may be at the single-photon level. For example, if the transmitting terminal emits pulses with a pulse frequency of 10 MHz, a mean signal photon counts received by the receiving terminal may be 80 kcps (kilo counts per second), namely, a mean signal photon counts per pulse is $8 \times 10^{-3}$. That is, most of pulses may be empty pulses. It may be impossible to effectively distinguish between a signal and background noise purely through photon counting due to strong noise. For example, assumed that the mean signal photon counts is 80 kcps and may follow the Poisson distribution. If the mean noise photon counts randomly vary within a range from 0 to 80 kcps, because of atmospheric turbulence and cosmic light in satellite-ground communication, it is impossible for photon counting to discern the signal from the background correctly.

First of all, before modulation, photon number n of a coherent light at the single-photon level may follow the Poisson distribution:

$$P_n = e^{-\mu} \frac{\mu^n}{n!} (n = 0, 1, 2 \ldots ). \tag{1}$$

Wherein μ denotes a mean photon number.

Within integration time $T_s=1$ ms, the arrival time of each photon detected by a single-photon detector are $\tau_1, \tau_2, \ldots, \tau_n$. Herein $0 \leq \tau_i < T_s$, and i=1, 2, ... n. The Fourier transform of the photon sequence may be expressed as below:

$$F_{(j\omega)} = \sum_{i=1}^{n} f(\tau_i) e^{-j\omega t_i}. \tag{2}$$

Wherein $f(\tau_i)$ denotes amplitude of a pulse output by the single-photon detector.

After the coherent light source is subjected to intensity modulator at the transmitting terminal, time distribution of the photon sequence received at the receiving terminal may change according to a waveform and frequency of modulation signal. At the moment, it is assumed that a time sequence of output signal of the single-photon detector is $\tau_1', \tau_2' \ldots \tau_m'$, and m follows the Poisson distribution, $0 \leq \tau_k' < T_s$ and k=1, 2 ... m. It may also be assumed that the mean signal photon counts is the same before and after modulation. The spectrum of a single-photon sequence after modulation may be expressed as:

$$F_{(j\omega)} = \sum_{k=1}^{m} e^{-j\omega \tau_k} \tag{3}$$

Herein it is assumed that the amplitude of a pulse output by the single-photon detector after detecting a photon is $f(\tau_k)=1$.

Within the integration time $T_s$, for a photon sequence without modulation, its probability density distribution function may be expressed as:

$$p_{(t)} = \begin{cases} 1/T_s, & t \in [0, T_s] \\ 0, & \text{other} \end{cases} \tag{4}$$

Namely, photons may be evenly distributed within $[0, T_s]$.

A expectation amplitude spectrum may be expressed as:

$$F_{(j\omega)} = \sum_{i=1}^{n} \int_0^{T_s} e^{-j\omega t} \cdot \frac{1}{T_s} \cdot dt \quad (5)$$

$$= \frac{1}{\mu} \int_0^{T_s} e^{-j\omega T_s} \cdot dt$$

Namely, the spectrum expectation may be a direct current (DC) signal spectrum.

The time sequence distribution of the modulated photons is changed, and herein a sinusoidal function may be used as a modulated signal. Therefore, probability density function of a modulated photon sequence may be expressed as:

$$p_{(t)} = \begin{cases} A \cdot (\sin(2\pi f t + \varphi) + 1, & t \in [0, T_s] \\ 0, & \text{other} \end{cases} \quad (6)$$

Wherein the $$A = \frac{1}{\int_0^T \sin(2\pi f t + \varphi) + 1) \cdot dt}$$

may denote a normalization coefficient, and the $\varphi$ may denote an initial phase of the modulated signal. The expectation of the modulation spectrum may be expressed as:

$$F_{(j\omega)} = \int_0^{T_s} A \cdot e^{-j\omega t} \cdot (\sin(2\pi f t) + 1) \cdot dt \quad (7)$$

$$= -\frac{j(1 - e^{-j\omega T_s})}{\omega} + \frac{e^{-j\omega T_s} \cdot (-2\pi f e^{j\omega T_s} + 2\pi f \cdot \cos(2\pi f T_s) + j\omega \cdot \sin(2\pi f T_s))}{\omega^2 - 4f^2 \pi^2}$$

In this formula, the first item may be a DC item corresponding to a low-frequency noise in the spectrum. The second item may be an alternating current (AC) item corresponding to information of the modulated signal. Thus as can be seen, frequency information loaded by the transmitting terminal may be obtained by performing a spectral analysis on the single-photon sequence.

Figure 3:
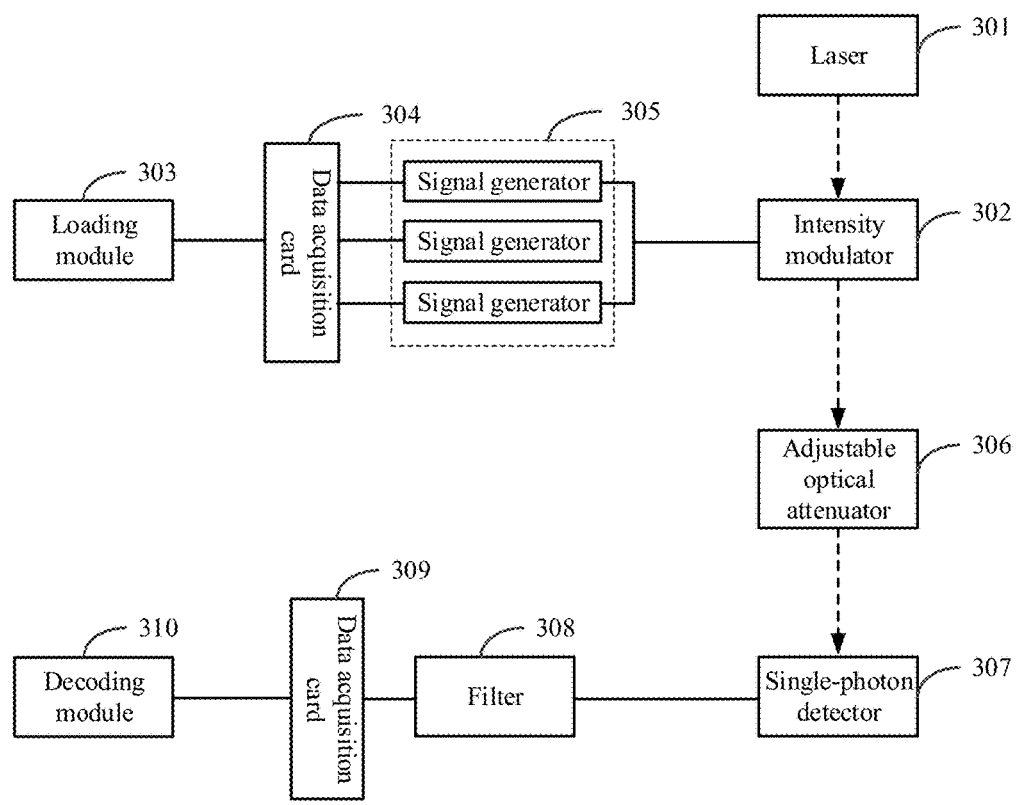
FIG. 3 is a block diagram schematically illustrating functional modules of a single photons communication system according to one example of the present disclosure.

The examples of the present disclosure may be described hereinafter through one specific application example, in which the above coding scheme may be employed for image transmission. FIG. 3 is a block diagram schematically illustrating functional modules of a communication system according to one example of the present disclosure. The solid and dashed lines denote the electrocircuit and the light route respectively. A laser source 301 (its model may be RFLG-25-1-1550.00-UNL) may output laser beam with a wavelength of 1550 nm, which may be inputted into an intensity modulator 302 through a fiber optic isolator (not shown in FIG. 3). A transmittance of the intensity modulator 302 may be in direct proportion to a modulation voltage loaded on the intensity modulator 302. A coding device 303 may first decompose a color image into three monochrome gray images. Then digital coding may be performed on the three monochrome gray images according to the one-to-one correspondence between the gray value and the modulation frequency as shown in Table 1. Afterward, the coding device 303 may send a digital signal including R, G and B parameters of each pixel point of the image to a data acquisition card 304. The data acquisition card 304 may control three signal generators 305 to respectively output a modulation signal with corresponding frequency, such as a sinusoidal signal. The three groups of sinusoidal signals may be superposed and then loaded on a modulation port of the intensity modulator 302. After receiving a photon emitted by the laser source 301, the intensity modulator 302 may modulate the emission probability of the photon according to the superposed signal of the three groups of sinusoidal signals, and the modulated single-photon emission probability may be positively correlated with the amplitude of the modulation signal. An integration time of a single pixel point may be 1 ms. An adjustable optical attenuator 306 may be arranged after the intensity modulator 302 to simulate channel loss. Channel noise may be simulated by adjusting a modulation depth of the intensity modulator 302. For example, when the modulation depth is set as 0.5, the intensity modulator 302 may only have a half of probability to modulate photons, and the other photons may be act as a role of channel noise.

A single-photon detector 307 is used to detect incident single photons, and the mean signal photon counts may be 80 kcps. The single-photon detector 307 may send a pulse signal according to the received photon sequence. After passing through a filter 308, the pulse signal may be converted by data acquisition card 309 into a digital signal. A decoding device 310 may obtain modulation frequency information corresponding to the transmitting terminal by means of a spectral analysis.

Figure 5:
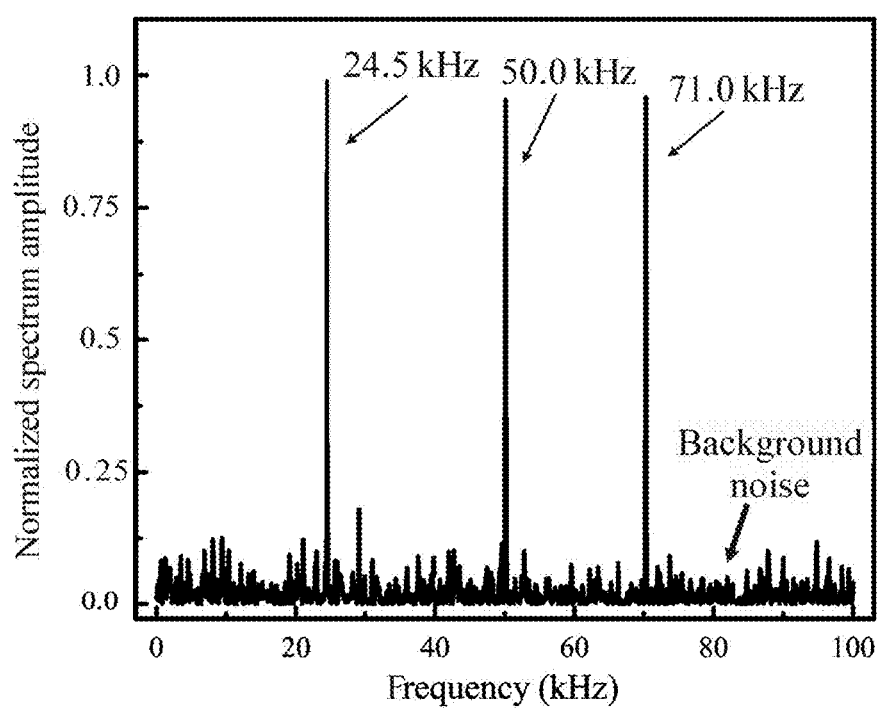
FIG. 5 shows a spectrum of a modulated photon sequence.

As shown in FIG. 5, the spectrum has three characteristic spectrum lines, whose locations are 24.5 kHz, 50.0 kHz and 71.0 kHz respectively. Gray values respectively corresponding to the three characteristic spectrum lines may be obtained from Table 1: B10, G5 and R3, and thus pixel information sent by the transmitting terminal may be recovered.

Figure 6A:
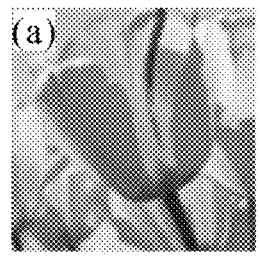
FIGS. 6A, 6B, and 6C are diagrams showing comparison of an image before and after being transmitted.
Figure 6B:
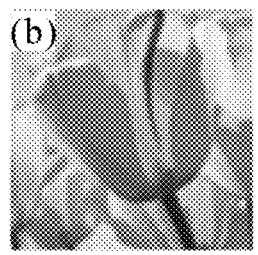
Figure 6C:
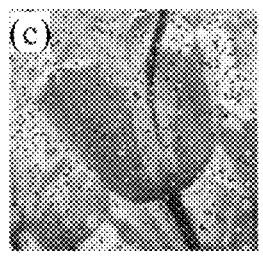

FIGS. 6A, 6B and 6C respectively are comparison diagrams before and after image transmission obtained from experiments. FIGS. 6B and 6C are the retrieved images when the mean photon counts is 80 kcps and 10 kcps, respectively. The integration time $T_s$ is 1 ms, pulse repetition frequency is 10 MHz. When the mean photon counts is 80 kcps, the error rate e=4.8×10$^{-8}$. But, the capacity of resisting erasure and noise of any coding scheme is limited. When the erasure rate or background noise is too large to be ignored, transmission errors would be inevitable. When the mean photon counts is 10 kcps, the error rate e of the FIG. 6C is up to 0.10.

It is to be noted that a frequency loading process may be not only achievable by using the intensity modulator 302, but also could be achieved by using a polarization rotator or a phase modulator. Namely, frequency loading may be not only achieved by modulating the emission probability of the incident photons, but also achieved by modulating the polarization state and the phase of the light source.

Figure 4:
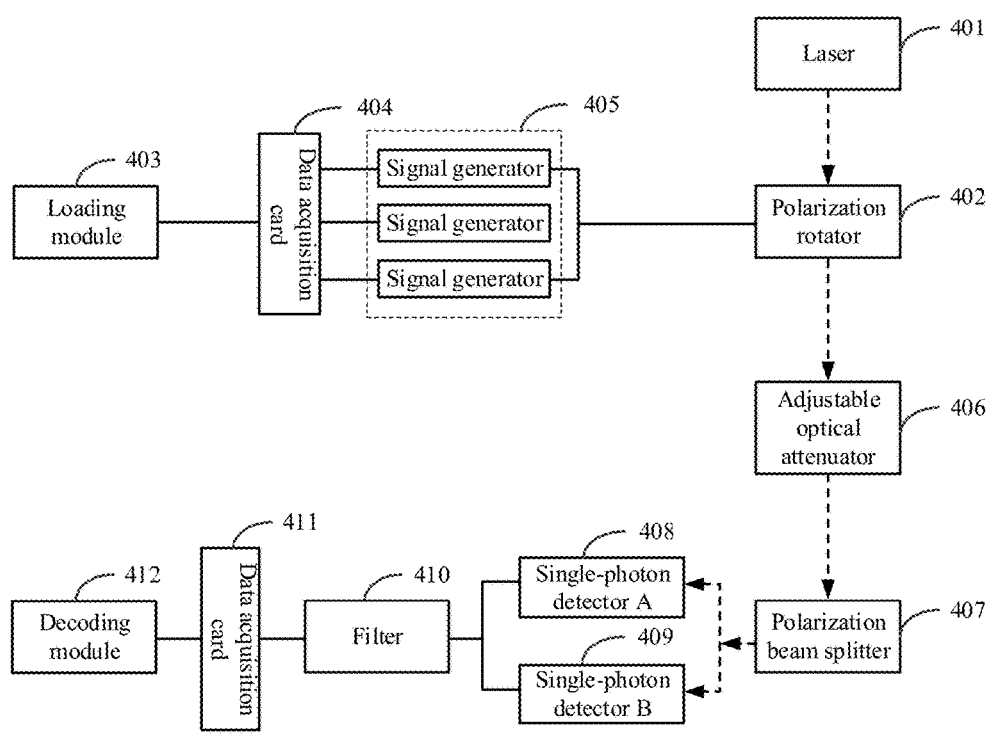
FIG. 4 is a block diagram schematically illustrating functional modules of a single photons communication system according to another example of the present disclosure.

Taking a polarization modulation as an example, FIG. 4 is a block diagram illustrating functional modules of a single photons communication system according to another example of the present disclosure. The solid and dashed lines denote the electrocircuit and the light route respectively. FIG. 4 differs from FIG. 3 in that, the intensity modulator 302 in FIG. 3 may be replaced with a polarization rotator 402, meanwhile a polarization beam splitter 407 may be added, the number of the single-photon detectors may be increased to two, namely a single-photon detector A 408 and a single-photon detector B 409. Two orthogonal polarization states may be preset on the polarization rotator 402, namely a polarization state A and a polarization state B. The polarization rotator 402 may set the amplitude of the modulated signal to be in direct proportion to a rotation angle of a polarization state, wherein a variation range of the rotation angle may be from 0° to 90°. The rotation angle 0° may correspond to the polarization state A, and the rotation angle 90° may correspond to the polarization state B.

It is to be noted that if information encoding is implemented by means of polarization and phase modulation of photons in a coding process, photons having different polarizations and phases may be differentiated and detected in a corresponding decoding process.

Taking a polarization modulation as an example, as shown in FIG. 4, received photons may be divided by the polarization beam splitter (PBS) 407 arranged at the receiving terminal into photons having the polarization state A and photons having the polarization state B. Then the photons having the above two polarization states may be detected respectively by using the single-photon detector A 408 and the single-photon detector B 409. After receiving the photons, the single-photon detector A 408 and the single-photon detector B 409 may respectively send out pulse sequence signal. The pulse signals sent by the single-photon detector A 408 and the single-photon detector B 409, being analog signals, may pass through a filter 410. Then the pulse signals may be respectively converted by a data acquisition card (DAQ) 411 into a digital signal A and a digital signal B. A decoding device 412 may receive the digital signal A and the digital signal B, and obtain a spectrum of the photon sequence through a Fourier transform. Optionally, $f(\tau_i)=1$ when the digital signal A is received; and $f(\tau_i)=-1$ when the digital signal B is received.

In addition, transmission of any binary file may also be implemented by the system.

A one-to-one correspondence between transmitted information and a modulation frequency may be saved in the shown coding device, and the modulation frequency may be decided according to binary information to be transmitted. For example, supposing a word "Light" is to be transmitted, the relationship as shown in Table 3 may be set up according to an ASCII code.

environment is researched. The correct decoding probability decreases with the mean noise photon counts. For different mean signal photon counts, the threshold may be different. Taking the dashed line in the figure where the mean signal photon counts is 160 kcps as an example, the threshold may be about 160 kcps. In other words, in the case where the mean signal photon counts is 160 kcps, the correct decoding probability approximate to 100% may still be implemented when the mean noise photon counts reaches 160 kcps. Thus as can be seen, the single-photon multi-channel frequency coding scheme may have an extremely powerful noise resistance capability.

Figure 7A:
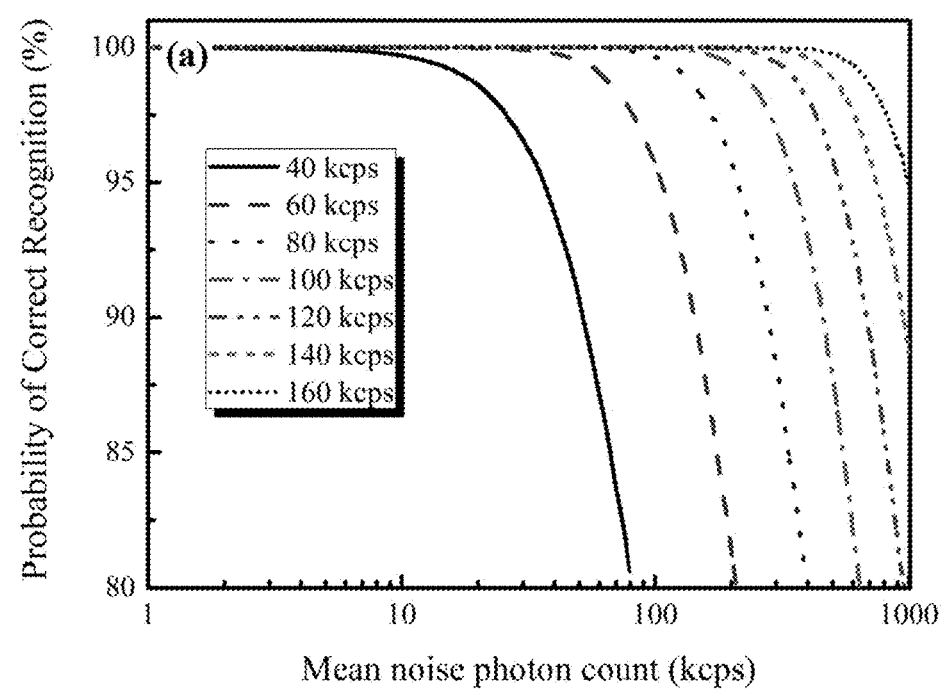
FIG. 7A is a probability distribution of correctly recognizing a modulation frequency by a receiver with different noise counts.
Figure 7B:
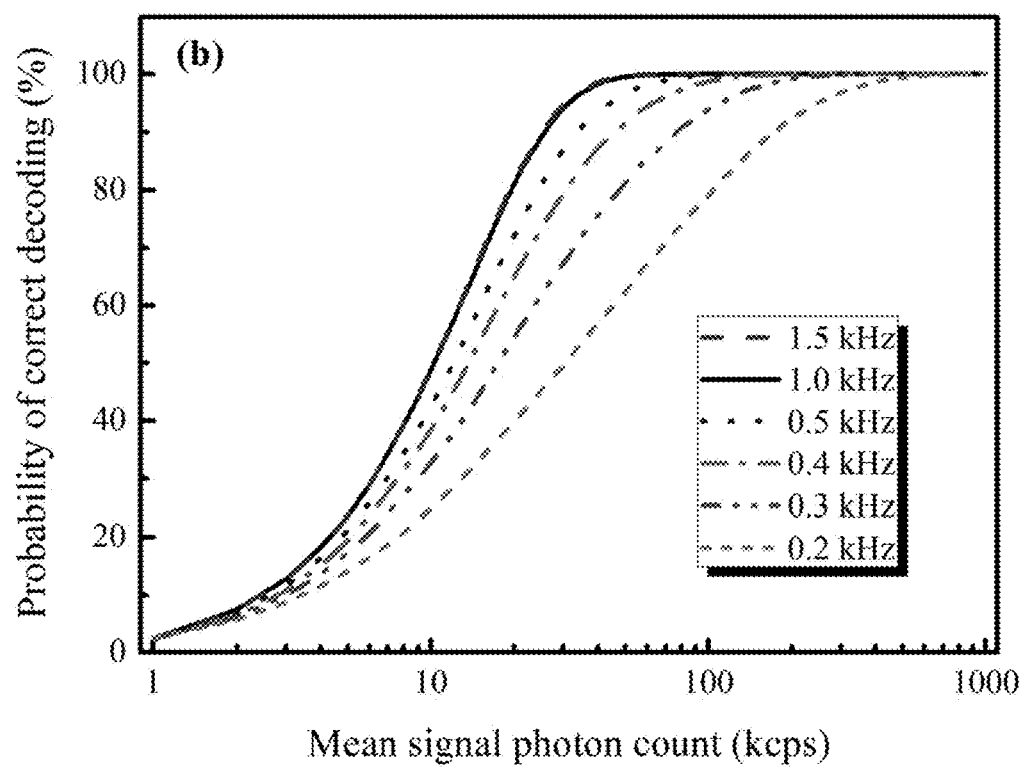
FIG. 7B is a probability distribution chart of correctly recognizing a modulation frequency by the receiver with different channel spacing.

FIG. 7B shows a relationship between the correct decoding probability and the mean signal photon counts of the receiver under different channel spacings. As can be seen from FIG. 7B, as the channel spacing becomes narrower, the correct decoding probability may decrease; However, it is not always better as the channel spacing is larger. When the channel spacing is too large, the correct decoding probability may be increased, but meanwhile waste of bandwidth may be caused, thereby channel capacity may likely be reduced. Therefore, to a particular communication system, a smaller channel spacing may be selected properly on the premise of ensuring the correct decoding probability.

Figure 7C:
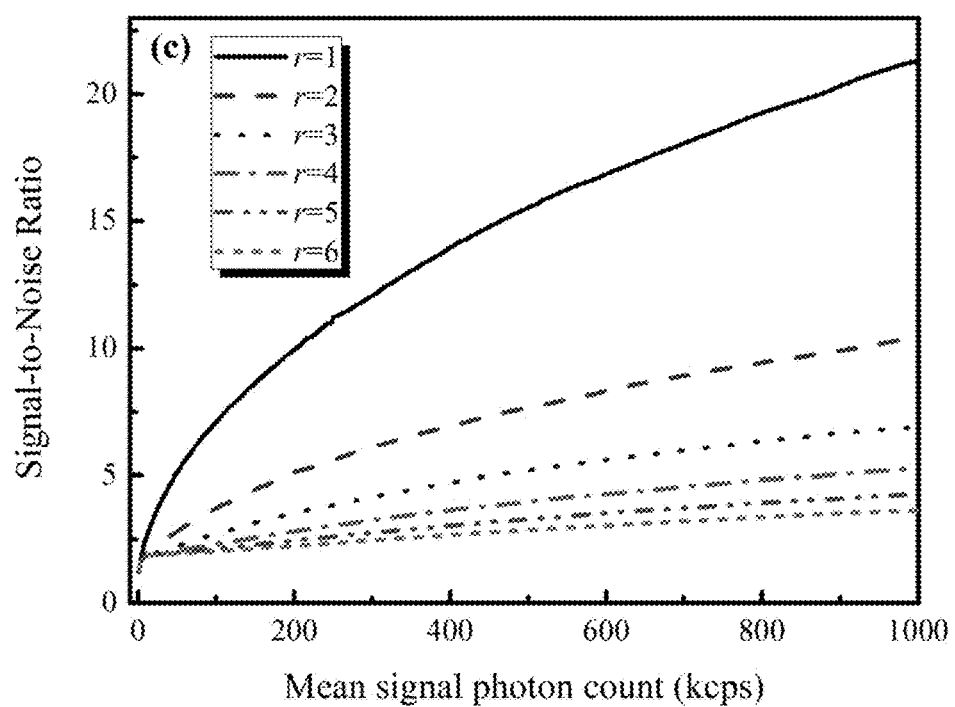
FIG. 7C shows a signal-to-noise ratio of a modulation spectrum under different frequency component conditions.
Figure 7D:
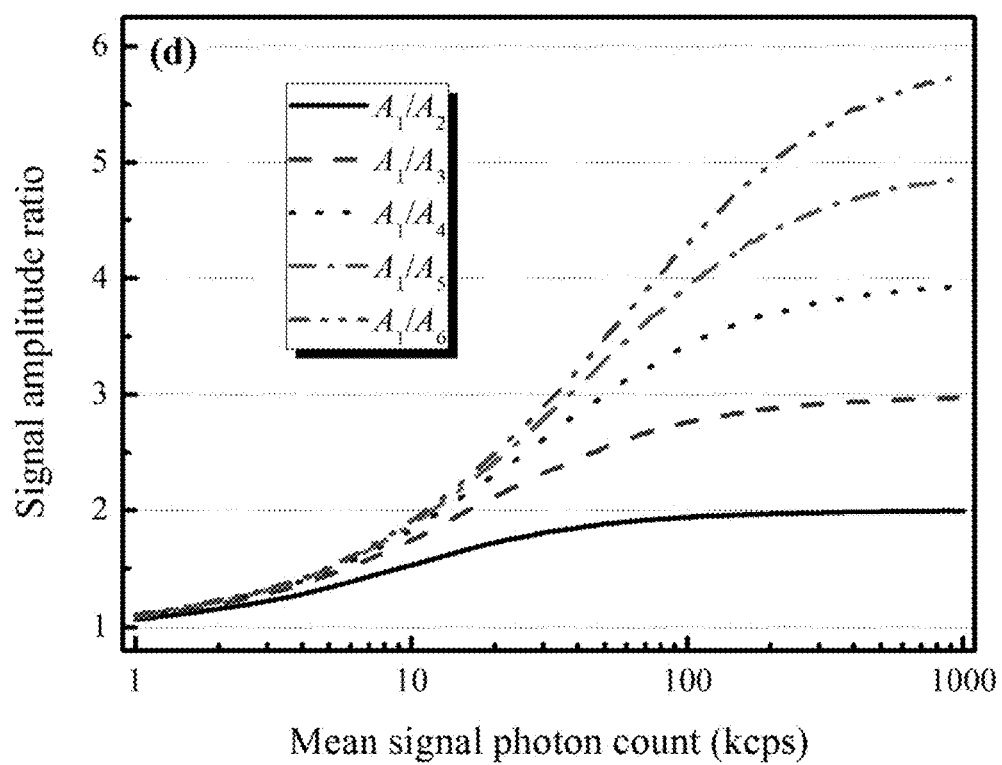
FIG. 7D shows an amplitude ratio of characteristic spectrum lines of a modulation spectrum with different frequency components.

Referring to FIG. 7C, a relationship between frequency components and a signal-to-noise ratio of a modulation spectrum may be presented. FIG. 7C shows that the signal-to-noise ratio may decrease as the increase of frequency components when the frequency components r=1, 2, 3, 4, 5 and 6. In FIG. 7D, an amplitude ratio of characteristic spectrum lines corresponding to different frequency components may be provided. Generally, the amplitude may decrease linearly as the frequency components increase. However, the characteristic spectrum line amplitude ratio may nonlinearly vary when the mean photon number is small because the single-photon modulation spectrum is affected by a quantum shot noise. The quantum effect may gradually weaken as the mean photon number increases, thereby the amplitude ratio characteristic spectrum lines may gradually tend to linearly vary. As shown in FIG. 7D, $A_1/A_2$ may gradually tend to be 2 as the mean photon number increases, wherein $A_1, A_2, A_3, A_4, A_5$ and $A_6$ may be

TABLE 3

|  | L |  | i |  | g |  | h |  |  | t |
|---|---|---|---|---|---|---|---|---|---|---|
| Binary | 0100 | 1100 | 0110 | 1001 | 0110 | 0111 | 0110 | 1000 | 0111 | 0100 |
| Modulation Frequency (kHz) | 100 | 300 | 150 | 225 | 150 | 175 | 150 | 200 | 175 | 100 |

The receiver may obtain a modulation frequency by performing a spectral analysis on the received single-photon sequence, and may obtain a binary sequence transmitted by the sender according to the relationship between modulation frequency and binary sequence, thereby achieving information transmission. As shown in Table 3, when the receiver in succession receives photon sequence with a modulation frequency of 100 kHz and a modulation frequency of 300 kHz, it may be determined that the sender sends a letter "L".

The channel capacity and a code error rate e of the single photons communication system may mainly depend on factors such as a mean noise photon counts, a channel spacing, frequency components, and so on. In FIGS. 7A, 7B and 7C, the three factors are respectively analyzed.

Referring to FIG. 7A, a correct decoding probability (1−e) of single-photon multi-channel frequency coding in a noise respectively the characteristic spectrum line amplitude of the number of frequency components r=1, 2, 3, 4, 5, and 6.

I. Precision Analysis

A spectrum variance of a single-photon sequence may be deduced as below. Supposing $X_{(\omega)}$ denotes an actual amplitude of spectrum in an individual measurement, the spectrum variance may be expressed as:

$$\mathrm{var}\{X_{(\omega)}\}=E\{[X_{(\omega)}-E\{X_{(\omega)}\}]^2\}=N\!\int_0^{T_s}\!A\cdot[e^{-j\omega f_s}]^2\cdot(\sin(2\pi ft+\varphi)+1)\cdot dt - N[\int_0^{T_s}\!A\cdot e^{-j\omega T_s}\cdot(\sin(2\pi ft+\varphi)+1)\cdot dt]^2 \quad (8)$$

In consideration that the detected photon counts may follow the Poisson distribution, it is assumed that the mean signal photon counts is N.

$$\text{var}\{X_{(\omega)}\} = \sum_{n=1}^{\infty} n \cdot p_{(n)} \cdot \left( \int_0^{T_s} A \cdot [e^{-j\omega t}]^2 \cdot \sin(2\pi \text{ft} + \varphi) + 1 \right) dt - \quad (9)$$

$$\left[ \int_0^{T_s} A \cdot e^{-j\omega t} \cdot (\sin(2\pi \text{ft} + \varphi) + 1) dt \right]^2 \right)$$

$$= \frac{1}{2} \left( -\frac{j(1 - e^{-2j\omega T_s})}{\omega} + \frac{\begin{pmatrix} e^{-2j\omega T_s}(-\pi f \cdot e^{-2j\omega T_s} + \\ \pi f \cdot \cos(2\pi f T_s) + \\ j\omega \cdot \sin(2\pi f T_s)) \end{pmatrix}}{\omega^2 - f^2 \pi^2} - \right.$$

$$2 \left. \left( \frac{\begin{pmatrix} e^{-j\omega T_s}(-2\pi f \cdot e^{-j\omega T_s} + \\ 2\pi f \cdot \cos(2\pi f T_s) + \\ j\omega \cdot \sin(2\pi f T_s)) \end{pmatrix}}{w^2 - 4\pi^2 f^2} + \frac{j \cdot (\cos(\omega T_s) - 1) + \sin(\omega T_s)}{\omega} \right) \right)^2 \right)$$

wherein $$p_{(n)} = \frac{e^{-N} \cdot N^n}{n!},$$

herein $\varphi = 0$. The first item and the second item in the formula may show that the spectrum variance may largen at the location of f.

II. Channel Capacity

Supposing n photons are detected within the integration time $T_s$, the arrival time of each detected photons are: $\tau_1, \tau_2, \ldots$ and $\tau_n$ respectively; corresponding time jitter in detection of output pulse may be: $\Delta\tau_1, \Delta\tau_2, \ldots$ and $\Delta\tau_t$ respectively; and at the moment, the discrete time Fourier transform of the single-photon sequence may be expressed as:

$$F_{(\omega)} = \sum_{k=1}^{n} e^{-j\omega(\tau_k + \Delta\tau_k)}, k = 1, 2, \ldots n \quad (10)$$

wherein $\Delta\tau$ may follow the Gaussian distribution $g_{(\Delta\tau)}$ and may be independent of $\tau$; and the Fourier transform of the $g_{(\Delta\tau)}$ may be $G_{(\omega)}$. The amplitude variance of spectrum could be expressed as:

$$\text{var}\{X_{(\omega)}\} = A \cdot N \cdot \left( \int_0^{T_s} [e^{-j\omega t}]^2 \cdot (\sin(2\pi \text{ft}) + 1) \cdot dt - \quad (11)$$

$$\left[ \int_0^{T_s} e^{-j\omega t} \cdot (\sin(2\pi \text{ft}) + 1) \cdot dt \right]^2 \right) +$$

$$A \cdot N \cdot \left[ \frac{1 - |G_{(\omega)}|^2}{|G_{(\omega)}|^2} \right] \cdot \int_0^{T_s} [e^{-j\omega t}]^2 \cdot (\sin(2\pi \text{ft}) + 1) \cdot dt$$

wherein the second item in the formula may be the amplitude variance of spectrum caused by the time jitter of the single-photon detector.

In an experiment, an achievable modulation frequency bandwidth may be 1 GHz due to a limitation by time jitter of a single-photon detector. To a given quantum communication system, the existing optimal number of channels may be:

$$N_c = \frac{f_{max} - f_1}{f_b} + 1 \quad (12)$$

wherein the $f_{max}$ and the $f_1$ may denote the maximum modulation frequency and the minimum modulation frequency; and the $f_b$ may denote the channel spacing. Multi-frequency components could be loaded on a photon sequence simultaneously. Herein, it is assumed that r frequency components are loaded on one photon sequence. An effective degree of freedom of communication may be expressed as a number of combinations of r frequency signals:

$$N_{max} = \frac{N_c!}{r!(N_c - r)!} \quad (13)$$

An information transmission capability may be expressed as:

$$I = \frac{1}{T_s} \text{Log}_2^{N_{max}} \quad (14)$$

In the practice, the available bandwidth B≈1 GHz, the channel spacing $f_b = 1.5$ kHz, the integration time $T_s = 1$ ms, and r=3. Under these conditions, the communication rate reaches I=55.5 kbps.

III. Estimation of a Communication Distance

Taking free space laser communication as an example, a communication distance achievable based on a single-photon multi-channel frequency coding scheme may be calculated. Since the space environment may be approximate to the vacuum environment, in the case of interstellar communication, transmission loss may be ignored and only loss caused by laser beam divergence may be taken into account. A formula for calculating the free space laser beam divergence is $\theta = 1.22\lambda/D_1$, wherein $\lambda$ denotes a laser wavelength and $D_1$ denotes a diameter of a transmitting antenna.

Supposing in the case of interstellar communication attenuation of light intensity may be entirely caused by a beam divergence angle and the communication distance is L, a light spot radius after transmission may be $r = L \sin(\theta)$. Since a photon number density may follow the Gaussian distribution in the vertical direction of the beam, suppose the receiver's antenna aperture is $D_2$, a ratio of an intensity of light received by the receiver to a total intensity of emitted light may be:

$$\frac{I_1}{I_2} = \frac{\int_0^{\frac{D_2}{2}} G(x) \cdot \pi x \cdot dx}{\int_0^{r} G(x) \cdot \pi x \cdot dr}, \quad (15)$$

wherein the G(x) may be an x-related Gaussian function:

$$G(x) = \frac{1}{\sqrt{2\pi}\sigma} e^{-\frac{(x-\mu)^2}{2\sigma^2}}. \quad (16)$$

Suppose the sender's antenna aperture is $D_1 = 2$ m, the receiver's antenna aperture is $D_2 = 1$ m, the laser wavelength is 1550 nm, the transmitted power is 100 mW and the receiver's mean signal photon counts is 80 kcps. According to Formula (15), the communication distance may be calculated as approximate to $10^{12}$ km, which may be about 8.5 times of the diameter of the solar system.

Based on the above examples, the present disclosure is a single photons communication method and system, wherein the single-photon multi-channel frequency coding scheme could be operated in a wide bandwidth which makes the transmission capacity improved significantly. Compared with existing channel coding schemes, the multi-channel frequency coding scheme makes the best use of quantum statistical properties of a coherent light source and may overcome larger channel loss and noise. The multi-channel frequency coding scheme not only fit for long-distance laser communication, but also have potential application values in the field of quantum communication based on single-photons, etc.

The system of the present disclosure may have following advantages.

1. In the present disclosure, the single-photon multi-channel frequency coding may be employed, and the modulation frequency may not limit by the sampling theorem, which may be freely switched between kHz and GHz. Such a wide modulation bandwidth may allow the frequency coding to have a high channel capacity.

2. The multi-channel frequency coding may allow the sender to simultaneously load a plurality of modulation frequencies and may represent different bit series by means of a combination of different modulation frequencies. In this way, the degree of freedom of spectrum may be improved and the communication rate may be increased.

3. By using the multi-channel frequency coding, the receiver may only need to receive light at the single-photon level to recover information, and the sender may select to transmit intense laser. Therefore, the coding scheme may have an extremely powerful loss-resistance capability in the long-distance laser communication.

4. In the multi-channel frequency coding scheme, the receiver may extract information by means of frequency identification. The signal spectrum may correspond to the modulation frequency. The noise spectrum may be the white noise, whose energy may be evenly distributed at various frequency locations. When the mean noise photon counts is larger than a mean signal photon counts, a correct decoding probability approximate to 100% may still be implemented. Therefore, the coding scheme has the strong capability of noise immunity.

Other implementation schemes of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The examples set forth above are only illustrated as preferred examples of the present disclosure, and are not intended to limit the present disclosure. All modifications, equivalent substitutions and improvements made within the spirit and principles of the present disclosure shall fall within the protection scope of the present disclosure.

What is claimed is:

1. A single photons communication method, which is applicable to a transmitting terminal of an optical communication system, the method comprising:
    saving, by the transmitting terminal, a relationship between information and modulation frequency
    receiving, by the transmitting terminal, to-be-sent target information;
    coding, by the transmitting terminal, the to-be-sent target information as a target modulation frequency according to the relationship between information and modulation frequency;
    controlling, by the transmitting terminal, a modulator in the transmitting terminal to periodically modulate a quantum state of communication light generated by a light source according to the target modulation frequency so that the transmitting terminal sends out target communication light modulated according to the target modulation frequency;
    establishing, by the transmitting terminal, a total available modulation bandwidth and a channel spacing of the modulation frequency according to a channel, the optical communication system and user demands;
    dividing, by the transmitting terminal, the total available modulation bandwidth into a plurality of sub-bands; and
    determining, by the transmitting terminal, the relationship between information and modulation frequency respectively in each of the plurality of sub-bands according to the channel spacing.

2. The method according to claim 1, wherein the light source is selected from the group consisting of:
    a laser source; and
    a single-photon source.

3. The method according to claim 1, wherein the periodically modulating the quantum state of communication light is selected from the group consisting of:
    periodically modulating an emission probability of the communication light;
    periodically modulating a polarization state of the communication light; and
    periodically modulating a phase of the communication light.

4. The method according to claim 1, wherein the coding the to-be-sent target information as the target modulation frequency according to the relationship between information and modulation frequency comprises:
    allocating, by the transmitting terminal, at least one of the plurality of sub-bands to the to-be-sent target information; and
    coding, by the transmitting terminal, the to-be-sent target information as the target modulation frequency according to the relationship between information and modulation frequency in the at least one of the plurality of sub-bands allocated for the target information.

5. A single photons communication method, which is applicable to a receiving terminal of an optical communication system, the method comprising:
    saving, by the receiving terminal, a relationship between information and modulation frequency;
    receiving, by a single-photon detector in the receiving terminal, target communication light;
    recording, by the single-photon detector, a time sequence of receiving photons of the target communication light according to a quantum state of the target communication light;
    decoding, by the receiving terminal, a target modulation frequency according to which the quantum state of the target communication light is modulated, through a Fourier transform from the time sequence of receiving photons; and obtaining, by the receiving terminal, target information corresponding to the target modulation frequency according to the relationship between information and modulation frequency;

establishing, by the receiving terminal, a total available modulation bandwidth and a channel spacing of the modulation frequency according to a channel, the optical communication system and user demands;

dividing, by the receiving terminal, the total available modulation bandwidth into a plurality of sub-bands; and determining, by the receiving terminal, the relationship between information and modulation frequency respectively in each of the plurality of sub-bands according to the channel spacing.

6. The method according to claim 5, wherein the recording the time sequence of receiving photons of the target communication light according to the quantum state of the target communication light comprises:

when an emission probability of the target communication light subjects to frequency modulation, recording, by the single-photon detector, the time sequence of receiving photons of the target communication light;

when a polarization state of the target communication light subjects to frequency modulation, differentiating, by the single-photon detector, the photons of the target communication light according to the polarization state, and recording, by the receiving terminal, the time sequence of receiving the differentiated photons of the target communication light; and when a photon phase of the target communication light subjects to frequency modulation, differentiating, by the single-photon detector, the photons of the target communication light according to a phase, and recording, by the single-photon detector, the time sequence of receiving the differentiated photons of the target communication light.

7. A single photons communication system, comprising:

a transmitting terminal, comprising:
 a light source, configured to generate communication light; and
 a modulator;
wherein the transmitting terminal
 receives to-be-sent target information,
 codes the to-be-sent target information as a target modulation frequency according to a relationship between information and modulation frequency, and
 controls the modulator to periodically perform frequency modulation on a quantum state of the communication light according to the target modulation frequency so that the transmitting terminal sends out target communication light modulated according to the target modulation frequency;

a receiving terminal, comprising:
 a single-photon detector, configured to detect target communication light and send out a pulse sequence of receiving photons of the target communication light according to the quantum state of the target communication light; and
wherein the receiving terminal
 decodes, through a Fourier transform from the time sequence of receiving photons, the target modulation frequency according to which frequency modulation is performed on the quantum state of the target communication light, and
 obtains target information corresponding to the target modulation frequency according to the relationship between information and modulation frequency;

and wherein the single photons communication system is further configured to:
 establish a total available modulation bandwidth and a channel spacing of the modulation frequency according to a channel, the single photons communication system and user demands;
 divide the total available modulation bandwidth into a plurality of sub-bands;
 determine the relationship between information and modulation frequency respectively in each of the plurality of sub-bands according to the channel spacing; and
 allocate at least one of the plurality of sub-bands to the target communication light.

8. The system according to claim 7, wherein the light source is selected from the group consisting of:
 a laser source; and
 a single-photon source.

9. The system according to claim 7, wherein the modulator is selected from the group consisting of:
 an intensity modulator, configured to periodically modulate the emission probability of the communication light generated by the light source according to the target modulation frequency;
 a polarization rotator, configured to periodically perform frequency modulation on a photon polarization state of the communication light generated by the light source according to the target modulation frequency; and
 a phase modulator, configured to periodically perform frequency modulation on a photon phase of the communication light generated by the light source according to the target modulation frequency.

10. The system according to claim 7, wherein the single-photon detector is selected from the group consisting of:
 a single-photon avalanche photodiode, configured to receive photons of the target communication light; and
 a photomultiplier tubes, configured to receive photons of the target communication light.

11. The system according to claim 10, wherein the single-photon detector is specifically configured to:
 when an emission probability of the target communication light subjects to frequency modulation, detect a photon sequence of receiving photons of the target communication light;
 when a photon polarization state of the target communication light subjects to frequency modulation, differentiate the photons of the target communication light according to the photon polarization state and respectively send out a pulse sequence of receiving the differentiated photons of the target communication light; and
 when a photon phase of the target communication light subjects to frequency modulation, differentiate the photons of the target communication light according to the photon phase and respectively send out a pulse sequence of receiving the differentiated photons of the target communication light.

\* \* \* \* \*